(12) United States Patent
Van Essen et al.

(10) Patent No.: US 7,711,964 B2
(45) Date of Patent: May 4, 2010

(54) METHOD OF SECURING PROGRAMMABLE LOGIC CONFIGURATION DATA

(75) Inventors: Brian Christopher Van Essen, Cary, NC (US); Jeffrey Wayne Kidd, Hillsborough, NC (US); Christopher Maverick Petersen, Cary, NC (US); Herman H. Schmit, Pittsburgh, PA (US)

(73) Assignee: Carnegie Mellon University, Pittsburgh, PA (US)

( * ) Notice: Subject to any disclaimer, the term of this patent is extended or adjusted under 35 U.S.C. 154(b) by 666 days.

(21) Appl. No.: 11/605,669

(22) Filed: Nov. 29, 2006

(65) Prior Publication Data
US 2007/0074045 A1 Mar. 29, 2007

Related U.S. Application Data

(62) Division of application No. 10/260,171, filed on Sep. 30, 2002, now Pat. No. 7,197,647.

(51) Int. Cl.
*H04L 9/00* (2006.01)
(52) U.S. Cl. ..................................... 713/189
(58) Field of Classification Search ................ 380/277, 380/281, 284; 713/161, 164, 168, 189, 193
See application file for complete search history.

(56) References Cited

U.S. PATENT DOCUMENTS

| | | | |
|---|---|---|---|
| 5,745,734 A | 4/1998 | Craft et al. | |
| 5,915,025 A | 6/1999 | Taguchi et al. | |
| 5,946,478 A | 8/1999 | Lawman | |
| 5,970,142 A | 10/1999 | Erickson | |
| 6,118,869 A | 9/2000 | Kelem et al. | |
| 6,301,695 B1 | 10/2001 | Burnham et al. | |
| 6,305,005 B1 | 10/2001 | Burnham | |
| 6,327,634 B1 | 12/2001 | Statovici | |
| 6,331,784 B1 | 12/2001 | Mason et al. | |
| 6,356,637 B1 | 3/2002 | Garnett | |
| 6,357,037 B1 | 3/2002 | Burnham et al. | |
| 6,366,117 B1 | 4/2002 | Pang et al. | |
| 6,394,905 B1 | 5/2002 | Takeda et al. | |
| 6,654,889 B1 | 11/2003 | Trimberger | |
| 6,904,527 B1 * | 6/2005 | Parlour et al. ............... | 713/189 |
| 6,965,675 B1 | 11/2005 | Trimberger et al. | |
| 6,996,713 B1 | 2/2006 | Trimberger | |
| 2001/0015919 A1 | 8/2001 | Kean | |

OTHER PUBLICATIONS

Goldstein, S.C., et al., "PipeRench: A Reconfigurable Architecture and Compiler," Computer IEEE, pp. 70-77, Apr. 2000.
Goldstein, S.C, et al., "PipeRench: A Coprocessor for Streaming Multimedia Acceleration," Carnegie Mellon University School of Computer Science, pp. 1-12.

* cited by examiner

*Primary Examiner*—Beemnet W Dada
(74) *Attorney, Agent, or Firm*—Jones Day; Edward L. Pencoske (57) ABSTRACT

The present invention relates to a secure method of distributing configuration data for a programmable logic device (PLD). The configuration data is encrypted to generate encrypted configuration data. A decryption key is encrypted using a silicon key. The encrypted configuration data and the encrypted decryption key are transferred to a PLD. Within the PLD, the encrypted decryption key is decrypted using the silicon key. Then, also within the PLD, the encrypted configuration data is decrypted using the decryption key to recover the configuration data. The PLD is then configured using the configuration data. The silicon key may be communicated to the PLD by tying predetermined input pins to an active high voltage level or signal ground, to form a binary code.

16 Claims, 4 Drawing Sheets

METHOD OF SECURING PROGRAMMABLE LOGIC CONFIGURATION DATA

CROSS-REFERENCE TO RELATED APPLICATION

This application is a divisional of U.S. patent application Ser. No. 10/260,171, filed 30 Sep. 2002 now U.S. Pat. No. 7,197,647, and entitled "Method of Securing Programmable Logic Configuration Data."

BACKGROUND OF INVENTION

The present invention relates generally to the field of programmable logic and specifically to a method of securing configuration data for programmable logic.

The use of Programmable Logic Devices (PLD) in modern digital electronics is well known and widely practiced. PLDs are a class of general-purpose integrated circuit devices that can be configured for a wide variety of functions and applications. In general, PLDs comprise an array of logic elements and variable interconnection paths between the logic elements and the chip I/O. At least the interconnections, and in more complex PLDs the logic blocks and I/O pins as well, are programmable, allowing a system designer to implement a broad array of functions ranging from a collection of glue logic to complex state machines that perform high-order functions. The set of information that defines the programmed logic blocks and/or programmed interconnections is referred to herein as "configuration data."

The mating of configuration data and PLDs to create design-specific integrated circuit devices may occur at various times and in various manners, according to the type of PLD and the technology it employs. For example, Programmable Array Logic (PAL) devices, which typically comprise a sea of AND gates feeding a fixed OR array, are typically programmed via EEPROM fuse technology at manufacture or integration, and are fielded as design-specific, programmed chips. Field Programmable Gate Arrays (FPGA) are generally more complex devices, often comprising an array of programmable logic blocks, wherein the blocks are interconnected via a programmable interconnect. FPGA logic blocks are often implemented as Look-Up Tables (LUT), and configuration data is typically stored in volatile memory. The configuration of such devices into design-specific chips is thus "soft," or ephemeral, and does not reflect a permanent alteration of physical structures within the chip. In other words, the configuration data does not survive the loss of power, and must be re-loaded into the FPGA upon each power-up. Additionally, it is known to re-configure some or all of an FPGA's circuits occasionally or periodically.

A new class of programmable logic, referred to herein as Virtual Hardware Architecture (VHA) is described by Schmit et al. in "PipeRench: A Reconfigurable Architecture and Compiler," IEEE Computer, pages 70-76 (April 2000), incorporated herein in its entirety. In a VHA device, a plurality of Processing Elements containing programmable logic and register arrays, are arranged in a plurality of horizontal rows or "stripes," with programmable interconnection between the stripes. Efficient, complex Streaming Data Processors (SDP) may be constructed by configuring each stripe as a pipeline stage in a pipelined computational operation. The stripes and interconnect are dynamically reconfigured as necessary, in an ongoing fashion, to implement the pipelined operations.

A well-recognized problem with FPGAs, that is also present with VHAs, is that configuration data must be transferred, or downloaded, to the programmable logic device, at least as often as every power-up. Since the configuration data often embodies the intellectual property that represents the value added to the system, a significant danger is that the configuration data may be copied and used to configure PLD's in unauthorized or "bootleg" systems, without compensating the system designer. A number of solutions to this problem have been developed in the art.

For example, it is known to co-locate a memory containing the configuration data to be downloaded, and the PLD requiring the configuration data, on a Multi-Chip Module (MCM), wherein the data transfer bus interconnecting the two is inaccessible from the external pins of the MCM. This solution is costly, and precludes the economies of scale available by using system memory to store configuration data as well as perform other system functions.

Cryptography has been widely utilized to protect PLD intellectual property, by encrypting the configuration data, and providing dedicated decrypting circuits within the PLO. The encrypted configuration data may be freely distributed, as it is useless without a specific decryption key. Several models exist for the distribution of the decryption key to the PLD. In one model, decryption key may be distributed separately from the encrypted configuration data. While this approach is sufficient to defeat the casual or unsophisticated copier, both the encrypted configuration data and the decryption key reside within the software of the system in the field. By reverse-engineering the operating system and the various application modules therein, a dedicated and sophisticated copier may uncover the decryption key, decrypt the encrypted configuration data, and thereby unlock the system designer's intellectual property.

A second, more secure, method of decryption key distribution is to encode the decryption key into the PLD at manufacture, or at least prior to deploying the system in the field. For example, the key may be encoded in the mask works for the PLD; encoded after manufacture by conventional PLD programming, such as blowing fuses; written to non-volatile write-only memory; or the like. While this greatly enhances security, it dramatically increases the cost of the PLO, and hence the system, since each PLD for a particular system must be separately configured, and subsequently tracked as a customized part. Various other key distribution methodologies, such as third-party key management, introduce additional inefficiencies and increase costs.

SUMMARY OF THE INVENTION

In one aspect, the present invention relates to a secure method of distributing programmable logic configuration data, such as for an FPGA. The configuration data is encrypted using a first key to generate encrypted configuration data. A second key, operative to decrypt the encrypted configuration data, is encrypted using a third key. The encrypted configuration data and the encrypted second key are transferred to a programmable logic device. Within the programmable logic device, the encrypted second key is decrypted using the third key, to recover the second key. Then, also within the programmable logic device, the encrypted configuration data is decrypted using the second key to recover the configuration data. The FPGA is then configured using the configuration data. The third key may be communicated to the FPGA by tying predetermined input pins to an active high voltage level or signal ground, to form a binary code. The first and second keys may be a public/private key pair, or alternatively may comprise the same key.

In another aspect, the present invention relates to a secure method of distributing virtual silicon data for virtual hardware architecture device. The virtual silicon data is encrypted using a first key to generate cipher silicon data. A second key, operative to decrypt the cipher silicon data, is encrypted using a silicon key, to generate a system key. The cipher silicon data and the system key are transferred to a virtual hardware architecture device. Within the virtual hardware architecture device, the system key is decrypted using the silicon key, to recover the second key. Then, also within the virtual hardware architecture device, the cipher silicon data is decrypted using the second key to recover the virtual silicon data. The virtual hardware architecture device is then virtualized using the virtual silicon data, in an ongoing fashion. The silicon key may be communicated to the virtual hardware architecture device by tying predetermined input pins to an active high voltage level or signal ground, to form a binary code. The first and second keys may be a public/private key pair, or alternatively may comprise the same key.

DETAILED DESCRIPTION OF THE INVENTION

According to the present invention, configuration data for a Programmable Logic Device (PLD) is securely distributed to, and utilized in, field-deployed digital systems. That is, the configuration data is supplied in a format and according to a procedure that prevents the configuration data from being intercepted or copied in a usable form. This is accomplished by encrypting the configuration data prior to distribution. An associated decryption key is also encrypted, with a silicon key. The decryption key is recovered within the PLD from the system key, and the configuration data is decrypted on-board the PLD prior to its use in configuring the PLD's logic circuits and interconnect.

As used herein, the term Programmable Logic Device (PLD) refers broadly to a class of general-purpose digital circuits whose internal logical structure, interconnection, and/or pin-out—and hence the circuit's logic function—are specified by system designers in the form of configuration data that must be loaded into the circuit. By way of example and without limitation, the term PLD includes PAL, Complex Programmable Logic Devices (CPLD), Reconfigurable Logic Devices (RLD), and FPGA technologies. The term PLD additionally includes VHA devices, which may be implemented featuring pipeline reconfiguration, wherein stripes comprising programmable Processing Elements and their interconnect are dynamically reconfigured "on the fly" as necessary or desired to implement pipelined operations. In particular, the term PLD, as used herein, is not limited to a class of relatively low-density programmable logic devices such as PALs, as the term is sometimes used in the art.

Figure 1:
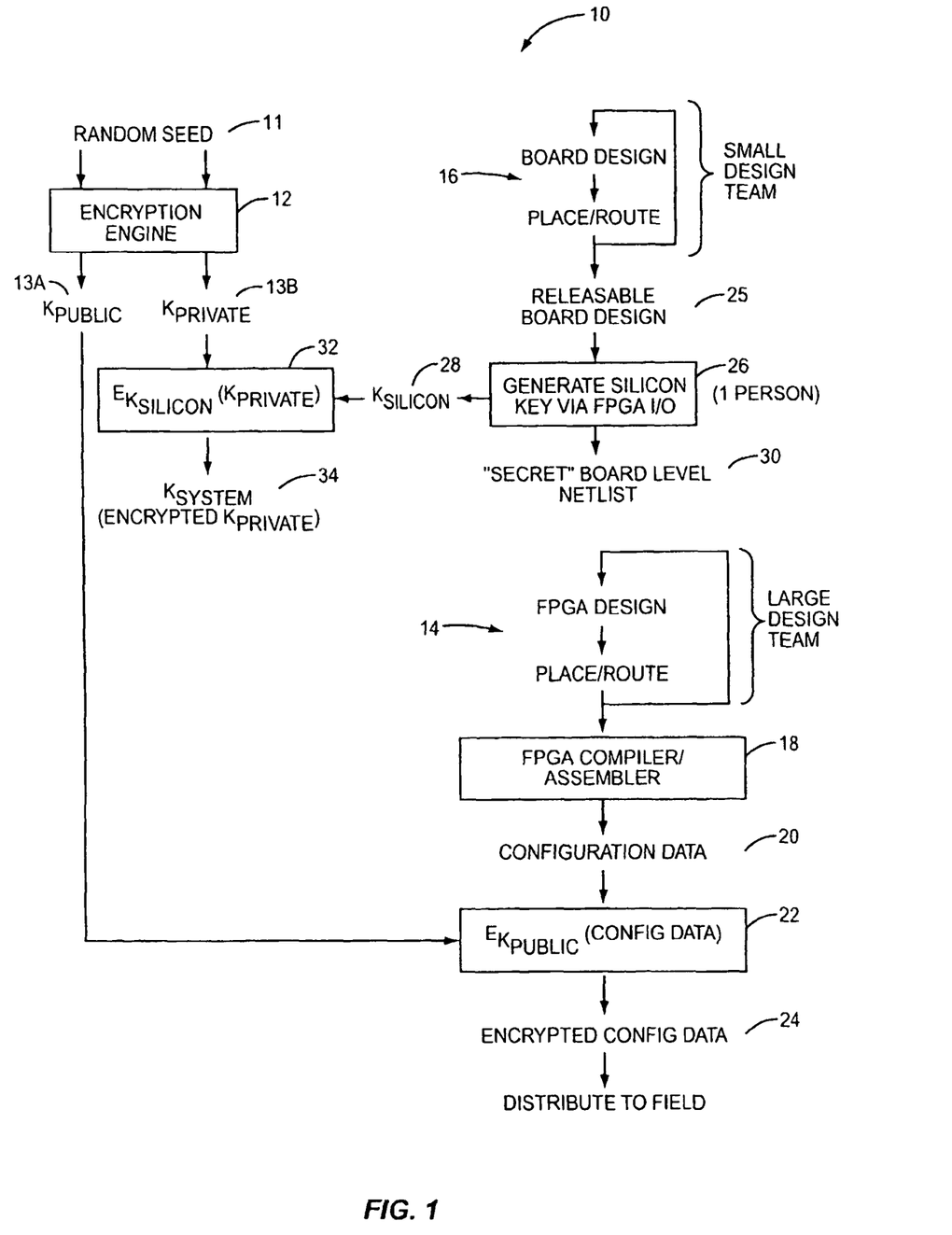
FIG. 1 is a flow diagram of one embodiment of the present invention, as applied to FPGA development.

FIG. 1 depicts a flow diagram of the chip and board design processes according to one embodiment of the present invention, specifically directed for explication to FPGA. Initially, one or more encryption keys are generated by an encryption engine 12. The encryption engine 12 may receive a user passphrase, and/or a random or pseudo-random seed 11, as is well known in the cryptographic arts. The encryption engine 12 depicted in FIG. 1 generates a pair of cryptographically related keys—a public key $K_{PUBLIC}$ 13A and a private key $K_{PRIVATE}$ 13B. As is well known in cryptography, a public/private key pair are one example of asymmetric key technology. A "message," or data, encrypted with either key may be decrypted utilizing the other key, but may not otherwise be decrypted, given realistically available computing resources. As discussed herein, the use of public key cryptography is advantageous; however, it is not required nor is the present invention so limited. For example, the encryption engine 12 may alternatively generate only a single, or symmetric key, used for both encryption and decryption of message data. Such a symmetric key is referred to herein by the numeral 13.

Both symmetric and asymmetric key encryption technology are well known in the cryptographic arts, and will not be further explicated herein. Additionally, the various constraint-driven implementations of the theoretical models (for example, the use of asymmetric keys to encrypt/decrypt symmetric session keys that actually encrypt/decrypt the message data), as well known in the cryptographic arts, are fully incorporated herein and fall within the practice of the present invention. Such techniques are described, for example, by Bruce Schneier, *Applied Cryptography*, ISBN 0471-12845-7 (1996).

FIG. 1 additionally depicts, as independent and parallel processes, the design of a PLD such as an FPGA, indicated generally at 14, and the design of the system-level interconnect, for example, a motherboard or other printed circuit board, indicated generally at 16. As is well understood by those of skill in the art, in practice the two design tasks are iterative and interrelated; the flow diagram of FIG. 1 presupposes the preliminary design steps of functional partitioning, and represents the latter stages of the design cycle.

The FPGA chip design flow 14 depicts a truncated, representative view of the generally iterative design process, comprising at least the steps of design and placement and routing, e.g., within and between the logic blocks of an FPGA. For modern designs, utilizing sophisticated and technologically advanced FPGAs, the FPGA design process may involve a fairly large design team. At the conclusion of the FPGA design cycle, the logic block design and interconnect signal routing data are compiled or assembled at 18 to generate the configuration data 20 that will be loaded into the FPGA upon power-up, to customize and configure the FPGA into a design-specific integrated circuit device.

To protect the intellectual property embedded in the configuration data 20, the configuration data 20 is encrypted at block 22 using, e.g., the public encryption key 13 $K_{PUBLIC}$. This operation generates encrypted configuration data 24, which is distributed to the field with the associated hardware.

FIG. 1 additionally depicts, in a generally parallel process, the circuit board design cycle 16. The board design, including component placement and signal routing, while complex, is a design task that generally requires a small design team. The board design process 16 results in a "releasable" board design 25, which may be released to test engineering, field repair technicians, and the like, as is standard industry practice.

According to the present invention, the board designer (or other designated individual) may alter the releasable board design 25, at step 26, to generate a "silicon key" $K_{SILICON}$ 28 which is defined herein as a binary code transmitted to a PLD via a predetermined plurality of input pins. For example, $K_{SILICON}$ 28 may be transferred to an FPGA by "tying" the predetermined input pins to an active "high" voltage or to signal ground in a particular pattern. By way of example and without limitation, dedicating twenty input pins to $K_{SILICON}$ 28 provides over one million (1,048,576) possible combinations. This modification to the releasable board design 25 generates a final, "secret" board level net list 30, which inherently contains the engineering documentation of $K_{SILICON}$ 28. As such, the secret board level net list 30 should be maintained as a trade secret, and access to it strictly limited. The value chosen for $K_{SILICON}$ 28 by the board designer may, in general, comprise any of $2^n$ binary patterns, where n input pins are dedicated to the silicon key. The value may be selected at random. Alternatively, the value selected for $K_{SILICON}$ 28 may be the same value as one or more of the keys $K_{PRIVATE}$ 13A or $K_{PUBLIC}$ 13B. In one embodiment, wherein the encryption engine 12 generates a symmetric key 13, $K_{SILICON}$ 28 may be the same as the symmetric key 13.

The $K_{SILICON}$ 28 is employed at block 32 to encrypt the private key 13B $K_{PRIVATE}$, generating a system key 34 $K_{SYSTEM}$. The $K_{SYSTEM}$ 34 is simply the encrypted $K_{PRIVATE}$ 13B (encrypted using the $K_{SILICON}$ 28). $K_{SYSTEM}$ 34 may be distributed to the field, along with encrypted configuration data 24, without fear of compromising the intellectual property embodied in the configuration data 20, since $K_{SYSTEM}$ 34 cannot be used to decrypt the encrypted configuration data 24. Thus, no expensive, cumbersome procedures or protocols are necessary to protect $K_{SYSTEM}$ 34.

According to the present invention, the critical information necessary to "unlock" the system designer's intellectual property resides, not in $K_{SYSTEM}$ 34 distributed with the system, but rather in $K_{SILICON}$ 28, that is embedded in the printed circuit board design. To secure this information against reverse engineering, the board designer preferably routes $K_{SILICON}$ 28 signal traces on internal signal layers (i.e., not on the upper or lower layers of the PC board). Additionally, the FPGA is preferably packaged in such a manner that at least the silicon key input pins are not accessible once the printed circuit board is populated with components and shipped to the field. For example, the FPGA may be packaged in a Ball Grid Array (BGA), wherein the "pins," or I/O connectors, form an array of "balls" arraigned on the underside of the chip package. The ball connectors contact corresponding conductive landing pads formed on the upper surface of the printed circuit board, and are soldered thereto for mechanical and electrical connection. As such, they are inaccessible once the system is deployed, and cannot, for example, be probed with a voltmeter or other lab equipment to ascertain their voltage state. Additionally, the chip is preferably secured to the printed circuit board using a non-conductive adhesive, such that any attempt to remove the FPGA from the printed circuit board in the field will result in the physical destruction of the chip package, the circuit board, or both.

Figure 2:
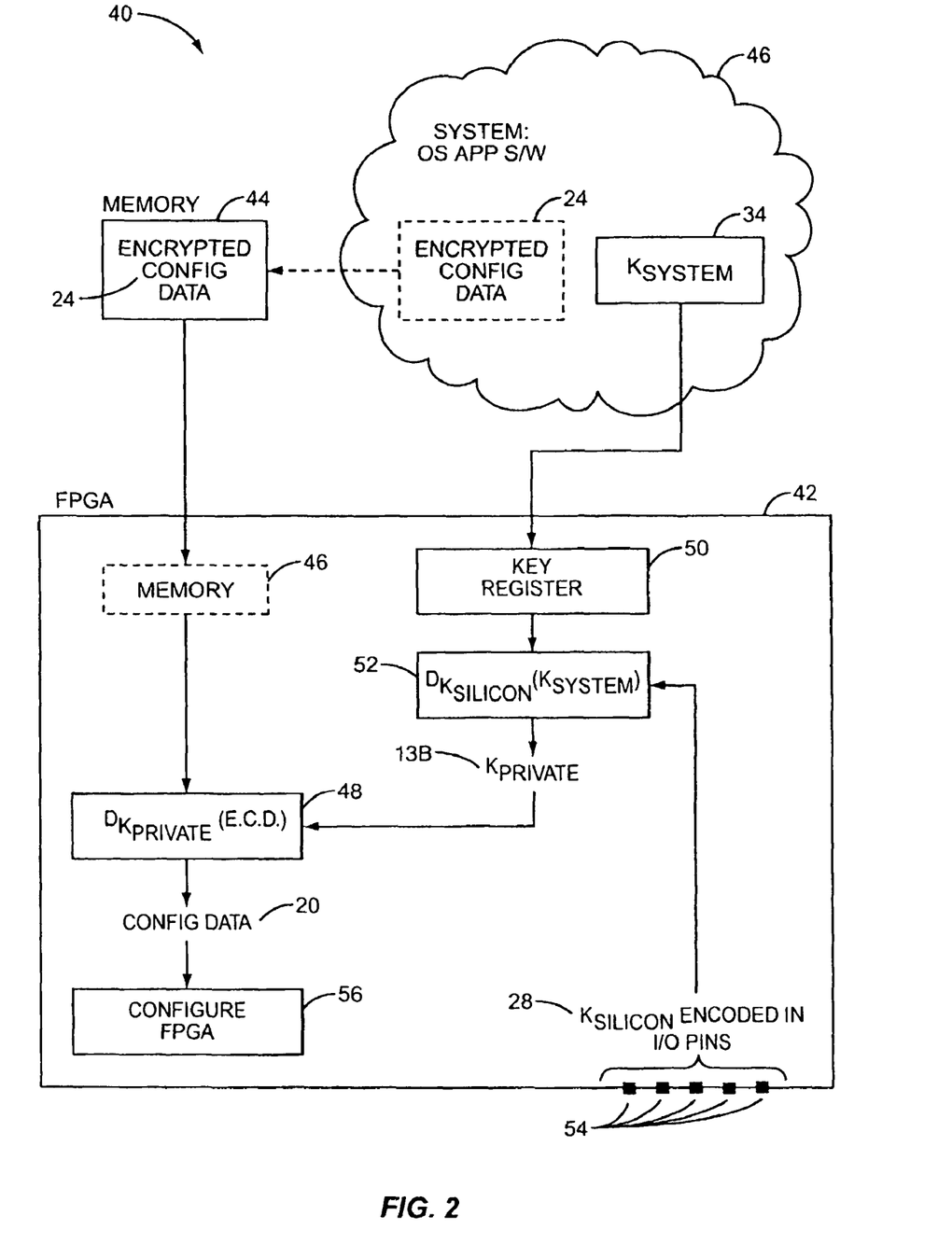
FIG. 2 is a partial functional block diagram of an FPGA in a system according to one embodiment of the present invention.

FIG. 2 depicts a field-deployed system according to the above-described embodiment of the present invention, indicated generally by the number 40. The system 40 includes an FPGA 42, memory 44, and system software 46. The system 40 may additionally contain numerous other components, such as a microprocessor; one or more Application Specific Integrated Circuits (ASIC); and chip sets and/or random logic implementing various dedicated functions or subsystems, such as graphics, video, wired or wireless communications interfaces, man-machine interfaces (keyboard and pointer input; graphic, audio output), power supply, real-time clock, and the like. Such components will vary widely depending on system design and functionality, are well known to those of skill in the art; as they do not aid in explication of the present invention, are not depicted in FIG. 2 nor discussed further herein.

System software 46, broadly construed, comprises operating system or other control software, application software, device drivers, dynamically linked libraries, protocol stacks, and the like. System software 46 may include encrypted FPGA configuration data 24, such as part of an application software program or device driver. Alternatively, the encrypted configuration data 24 may be stored in non-volatile memory 44. The system software 46 additionally contains $K_{SYSTEM}$ 34. According to the present invention, security risks inherent in the prior art encrypted configuration data distribution schemes are avoided, as $K_{SYSTEM}$ 34 is incapable of decrypting encrypted configuration data 24, even in the event that both are successfully recovered from system software 46 (such as through reverse engineering).

According to the present invention, at power-up, or as required thereafter, encrypted configuration data 24 is downloaded to FPGA 42, such as in a serial bit stream. The encrypted configuration data 24 may be buffered by memory 46 on board the FPGA 42, or alternatively may pass directly to decryption engine 48. Similarly, $K_{SYSTEM}$ 34 is downloaded to FPGA 42, where it may be temporarily stored in key register 50. Alternatively, $K_{SYSTEM}$ 34 may flow directly to the key decryption engine 52.

The key decryption engine 52 receives $K_{SYSTEM}$ 34, and $K_{SILICON}$ 28. As described above, $K_{SILICON}$ 28 may be encoded on a predetermined plurality of input pins to the FPGA 42. The key decryption engine 52 decrypts $K_{SYSTEM}$ 34, using $K_{SILICON}$ 28, to recover the private key 13B, $K_{PRIVATE}$ (or, in the case of symmetric key technology, a common encryption/decryption key 13).

The decryption engine 48 receives encrypted configuration data 24, and decrypts it using the recovered $K_{PRIVATE}$ 13B to recover the FPGA configuration data 20. The configuration data 20 is then used to configure the logic blocks, interconnect, and non-dedicated I/O of the FPGA, at step 56, in a conventional manner.

By encrypting $K_{PRIVATE}$ 13B to generate a $K_{SYSTEM}$ 34 that is inoperative to itself decrypt the encrypted configuration data 24, the present invention greatly enhances security over prior art configuration data encryption schemes. Regardless of the sophistication of "hackers," no information that can be discerned or intercepted outside of the FPGA 42 allows for decryption of the encrypted configuration data 24. The critical information necessary to ultimately effect such decryption—the silicon key 28, $K_{SILICON}$—is accessible only within the FPGA 42 (assuming a well-designed system, with buried signal traces and the FPGA 42 I/O connectors inaccessible). However, unlike prior art systems that encode a decryption key within each FPGA 42, such as by pre-programming via blowing fuses, encoding the key in mask works, or the like, the FPGA 42 according to the present invention requires no special processing or programming. Thus, the present invention places all aspects of configuration data security in the hands of system designers, not FPGA vendors.

According to the present invention, the ultimate secret to be safeguarded by designers is not so much the specific binary code comprising $K_{SILICON}$ 28, as the printed circuit board net list that defines such binary code. This information is inherently compartmentalized and readily secured, and need not be widely distributed as part of the design and development process. Indeed, a single individual, such as a project lead or program manager, may select and implement $K_{SILICON}$ 28 by tying the FPGA 42 dedicated silicon key input pins to active high or signal ground.

However, the communication of $K_{SILICON}$ 28 to the FPGA 42 is not limited to this technique. For example, rather than statically tying the FPGA 42 dedicated silicon key input pins to active high or signal ground voltage levels via printed circuit board signal traces, the pins may be routed to a connector. In this case, $K_{SILICON}$ 28 is provided by whatever is attached to the connector. Such an arrangement may be particularly advantageous with respect to VHA devices or FPGAs that are frequently reconfigured by reloading some or all configuration data 20. In these cases, the need for $K_{SILICON}$ 28 is on-going, and not limited to power-up. In high security applications, the system 40 may be designed to require different silicon keys 28 at different times, or within certain time windows, which keys may be provided via a wired or wireless communication receiver connected to the connector and operative to supply updated silicon keys 28.

Another embodiment of the present invention is particularly applicable to Virtual Hardware Architecture (VHA) devices. VHA is a new computing architecture, wherein a reconfigurable fabric is dynamically reconfigured on an ongoing basis to implement pipelined operations. The reconfigurable fabric of a VHA device comprises a plurality of Processing Elements (PE). Each PE includes an Arithmetic Logic Unit (ALU) and a pass register file. A plurality of PEs are arrayed in horizontal rows, with control and carry bits linking the PEs, allowing them to be concatenated for arbitrary bit width operations. A row of PEs is referred to herein as a physical stripe. The VHA fabric comprises a plurality of physical stripes, with variable interconnection between each stripe. Global busses also connect each stripe to chip I/O in a configurable manner.

The ALU of each PE is configurable, and may be implemented as a Look-Up Table (LUT). The inputs to the ALU are selectable, such as from a global bus, the output of a previous stripe, the pass registers of the current stripe, shifted versions of these data, and the like, through an array of multiplexors, whose selector bits are reconfigurable. The subset of configuration data that defines the ALU operation of each PE in a stripe, the inputs to the ALUs and pass registers in a stripe, and the interconnection between stripes are referred to as a virtual stripe. When a physical stripe is configured, or "virtualized," by applying a virtual stripe to it, the result, referred to as a virtualized stripe, implements a single stage of a pipelined operation. That is, a particular logic or arithmetic operation is implemented on data flowing into the stripe (from a previous stripe or pipeline stage, or chip I/O via a global input bus). As the ALU implements the logical or arithmetic operation via a LUT, the virtualized stripe effectively implements a virtual hardware operation. As data flows from one virtualized stripe to the next, it is effectively flowing through customized circuits implementing the pipeline operations. The result is near-hardware level speed, with the flexibility and generality of a software-based solution.

The depth of a pipelined operation is not limited by the number of available physical stripes in the VHA fabric. Consider a VHA chip that implements N physical stripes. To process a pipeline operation having M pipeline stages, M>N, the N physical stripes are virtualized to implement the first N of the M pipeline stages, and the data flows through the N stages. Then, the first physical stripe is reconfigured to implement pipeline stage N+1, with its data inputs routed from the output of the $N^{th}$ stripe. In the ensuing cycle, when the N+1 pipeline stage is being computed, physical stripe N+2 is being reconfigured. In this manner, during any cycle, N−1 virtual stripes are performing pipeline computations, and one stripe—that just ahead of the data—is being reconfigured. Because the depth of a pipelined operation is independent of the number of physical stripes available in a VHA fabric, an entire family of VHA chips, ranging in size and complexity, are binary compatible with respect to the configuration data.

That is, the succession of virtual stripes are the same; only the loading of the virtual stripes into the fabric and the synchronization of routing the data on- and off-chip differ from one VHA chip to the next, within a given VHA architecture family.

VHA devices thus differ significantly from FPGA devices in several respects. Among these is what may be referred to as the granularity of reconfigurability. Typically, FPGAs are configured once—at power-up. Although it is known in the art to re-configure FPGAs during operation, such re-configurations are infrequent, such as for example when changing modes of operation. Furthermore, the FPGA is typically shut down during reconfiguration, and must be started up again in the newly configured mode. On the other hand, reconfiguration of VHA devices is on a per-stripe basis, and furthermore is performed dynamically as data flows through the fabric. As such, the configuration data for a VHA device, also referred to herein as virtual silicon, is intermittently streaming into a control port of the VHA device throughout its operation. To protect the system designer's intellectual property embodied in the virtual silicon via encryption, the decryption performed on board the VHA device must be dynamic and ongoing.

Figure 3:
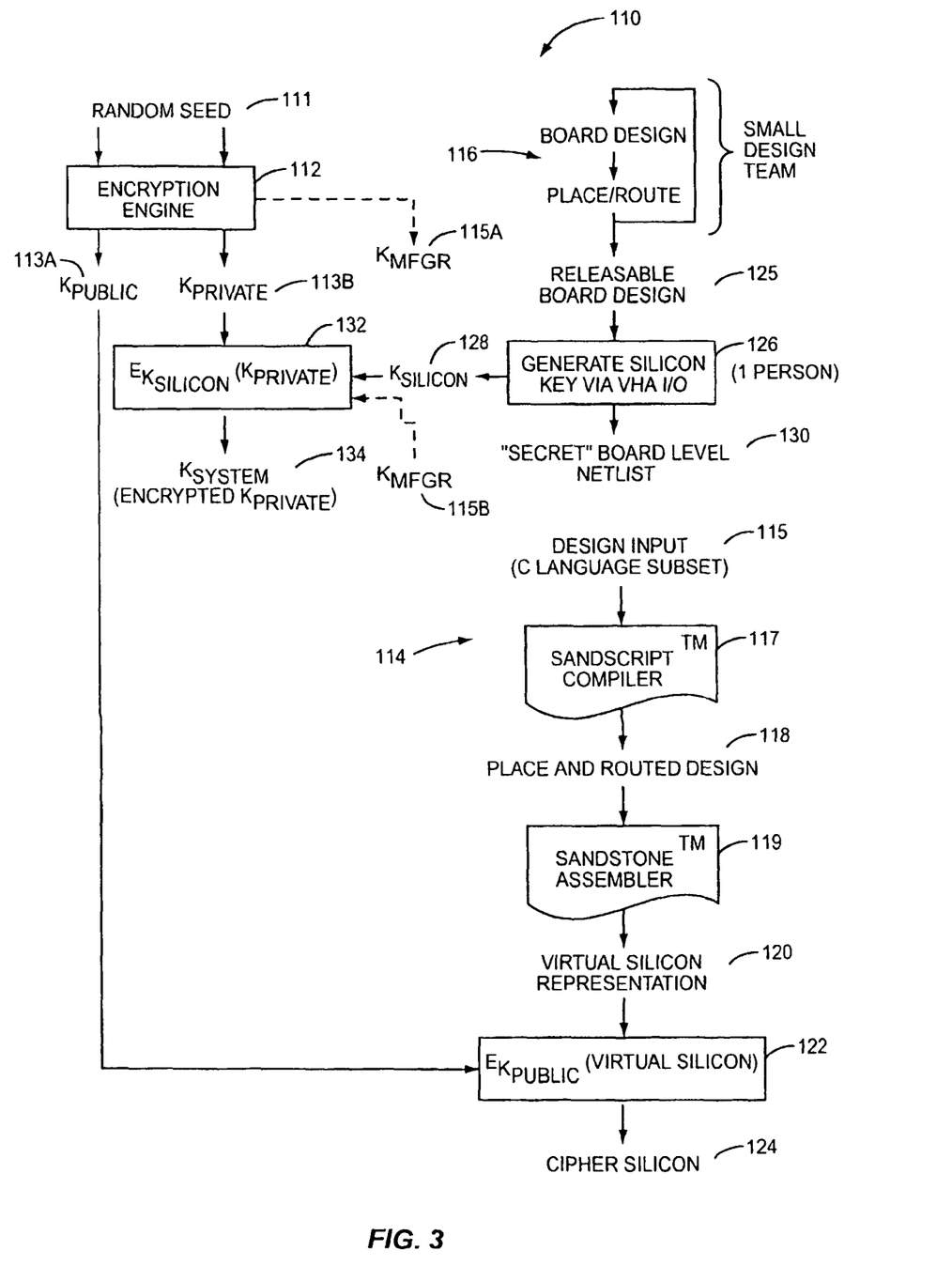
FIG. 3 is a flow diagram of another embodiment of the present invention, as applied to VHA development.

FIG. 3 depicts, in flow diagram form, the VHA device and circuit board design, indicated generally at 100, according to another embodiment of the present invention. Encryption engine 112 receives, e.g., a user passphrase and/or a random number seed 111, and generates asymmetric key pairs 113A $K_{PUBLIC}$ and 113B $K_{PRIVATE}$ (alternatively, the use of symmetric key technology to generate a single symmetric key 113 is specifically contemplated and within the scope of the present invention).

The system interconnect design, such as for example, a motherboard or other printed circuit board, proceeds in directly analogous fashion to that of the FPGA circuit board described above. An iterative design and place/route process 116 results in a releasable circuit board design 125. The releasable board design 125 may be modified at step 126 to generate a silicon key 128, $K_{SILICON}$, such as by tying a predetermined plurality of input pins to an active high voltage level or signal ground, to form a binary code. The modified board level net list 130 is subsequently maintained in secrecy.

The private encryption key 113B, $K_{PRIVATE}$, is encrypted at step 132 using $K_{SILICON}$ 128, to generate a system key 134, $K_{SYSTEM}$, which is an encrypted representation of $K_{PRIVATE}$ 113B.

The design process for VHA virtual silicon—or configuration data—differs significantly from that of FPGAs. In general, the design process more closely resembles that of system software design. Specifically, the design input 115 comprises a source code representation of the logical and arithmetic operations to be performed by the VHA device. In a preferred embodiment, the VHA source code is implemented via an Algorithm Dataflow Language (ADL) that has some similarity to a subset of the C programming language. In fact, the VHA programming language may comprise a subset of C language constructs and operations, thus leveraging the significant existing industry familiarity with C, and associated productivity tools. Additionally, the VHA ADL may use other Hardware Description Languages (HDL) for design input. The design input 115 is compiled into a VHA representation by a compiler 117. In particular, compiler 117 may comprise the SandScript™ compiler, available from SiliconMöbius, Inc. of Research Triangle Park, North Carolina. The compiler 117 generates a placed and routed design 118. The placed and routed design 118 is modified for implementation on a specific VHA device by assembler 119. In particular, assembler 119 may comprise the SandStone™ assembler available from SiliconMöbius, Inc. The assembler 119 generates a virtual silicon representation of the design 120. The virtual silicon 120 comprises a successive plurality of virtual stripes, each of which will configure any physical stripe of the VHA fabric. To protect the system designer's intellectual property represented by the virtual silicon 120, the virtual silicon 120 is encrypted at 122 with $K_{PUBLIC}$ 113, generating cipher silicon 124. Cipher silicon 124 is an encrypted version of virtual silicon 120 and may be freely distributed to field-deployed systems (analogous to the encrypted configuration data 24 discussed above with respect to FPGA systems).

Figure 4:
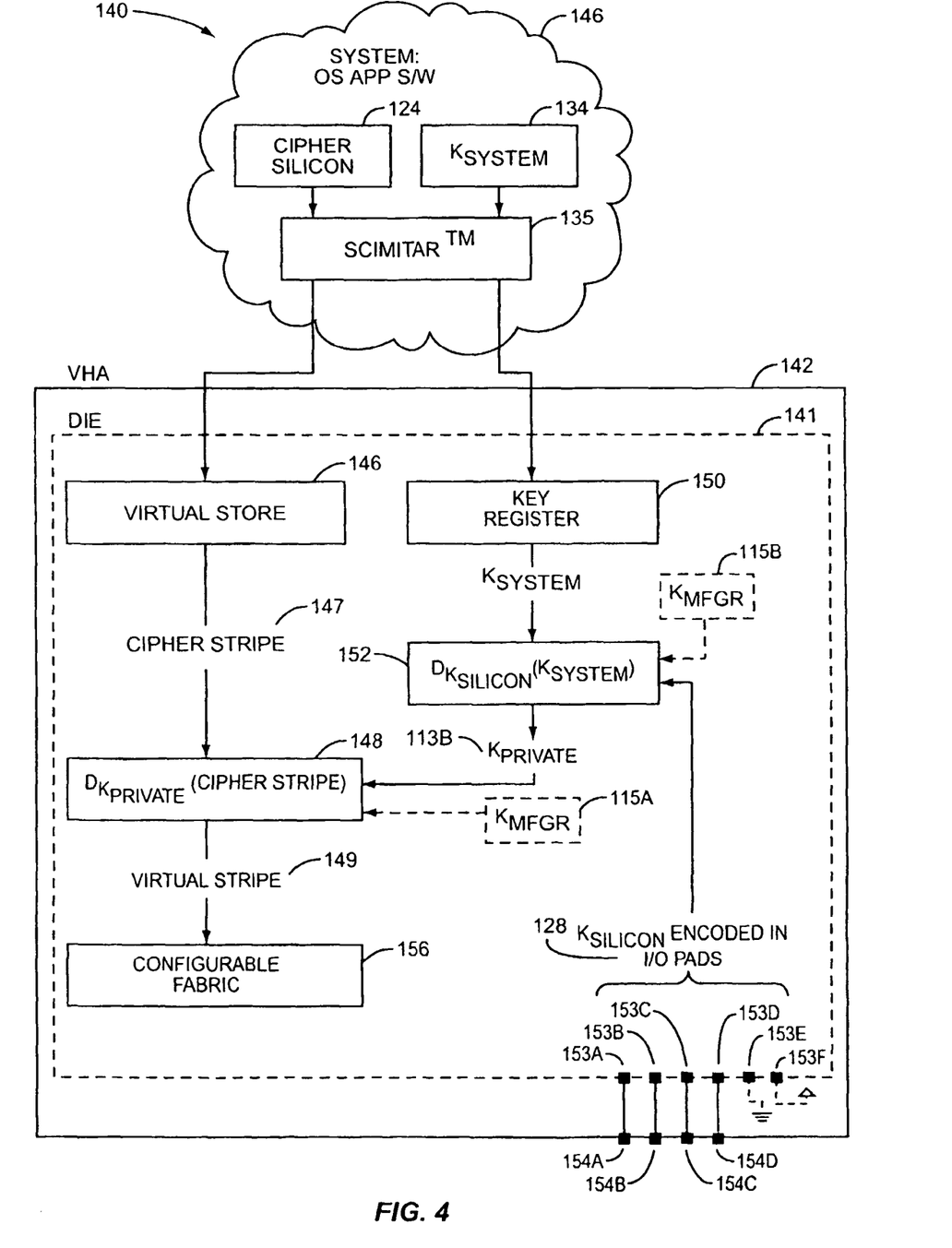
FIG. 4 is a partial functional block diagram of a VHA device in a system according to one embodiment of the present invention.

FIG. 4 depicts a deployed system, indicated generally by 140, including a VHA device 142 and system software 146. VHA device 142 is a packaged integrated circuit device, ready for mounting on a printed circuit board or the like. Within the package 142, the integrated circuit die 141 is depicted as a dotted line. The die 141 includes a plurality of I/O pads 153. Most I/O pads, such as 153A-153D, are bonded to I/O pins 154 of the package 142. Other I/O pads, such as 153E-153F may be tied to an active high voltage or signal ground internally to the package 142. The functional blocks in FIG. 4 depicted as residing within the die 141 are part of the integrated circuit, and are hence part of both the VHA die 141 and the packaged VHA device 142.

Other system components not pertinent to an understanding of the present invention are not depicted in FIG. 4. System software 146, which comprises, e.g., operating system or other control software, application software modules, device drivers, and the like, includes the cipher silicon 124 and $K_{SYSTEM}$ 134. As both of these data are encrypted, they may be securely fielded within the system software 146 without fear of reverse-engineering. Through an Application Programming Interface (API) 135, the cipher silicon 124 and $K_{SYSTEM}$ 134 are directed to the VHA device 142. The API 135, which may for example comprise the Scimitar™ VHA API available from SiliconMöbius, Inc., contains the device drivers and other software necessary to directly control the VHA device. Ongoing control is necessary, as the downloading of encrypted configuration data to the VHA device is an ongoing process (unlike an FPGA, which is typically configured only at power-up).

The cipher silicon 124 is received within the VHA device 142 and buffered in virtual store 146. $K_{SYSTEM}$ 134 is received by the VHA device 142 and stored in a key register 150. The key register 150 supplies $K_{SYSTEM}$ 134 to a key decryption engine 152. The key decryption engine 152 additionally receives a silicon key 128, $K_{SILICON}$, such as a binary code encoded on a predetermined plurality of input pins 154. The key decryption engine 152 decrypts $K_{SYSTEM}$ 134 to recover private key 113B, $K_{PRIVATE}$.

The cipher silicon 124 is supplied out of the virtual store 146, one cipher stripe 147 at a time, and directed to a decryption engine 148. The decryption engine 148 receives $K_{PRIVATE}$ 113B from the key decryption engine 152.

The decryption engine 148, on a continuous, ongoing, stripe-by-stripe, just-in-time basis, decrypts the succession of cipher stripes 147, recovering a corresponding sequence of virtual stripes 149. The virtual stripes 149 are then supplied to the configurable fabric 156 of the VHA device 142, where they are mated with available physical stripes to virtualize the fabric, implementing the virtual hardware architecture.

Preferably, the virtual stripes are decrypted and supplied to the fabric on an as-needed basis, i.e., immediately prior to virtualizing a stripe—as opposed to decrypting a segment of cipher silicon 124 and storing the corresponding virtual silicon 120 in memory until it is needed. This is to prevent access to the virtual silicon 120 via the JTAG port. By decrypting the cipher stripes 147 on a just-in-time basis, in the event the VHA device is halted and probed or scanned via the JTAG port, the only virtual stripes 149 that can be recovered are those that have already been virtualized into the fabric.

In some applications, it may be advantageous to ensure that a design that has been compiled, assembled, and otherwise prepared using a particular manufacturer or vender's tools may only be executed on a particular set of VHA hardware devices 142 (such as, for example, those produced by a particular manufacturer). This may, for example, be necessary to ensure that a manufacturer's investment in development tools is recouped in hardware sales, by disallowing the virtual silicon generated using the tools from being executed on foreign hardware. According to two embodiments of the present invention, the encryption of virtual silicon for secure distribution may additionally ensure that the virtual silicon is only executable on enabled VHA devices 142.

In one embodiment, and with reference to FIG. 3, the encryption engine 112 that generates cryptographic keys $K_{PUBLIC}$ 113A and $K_{PRIVATE}$ 113B may additionally generate another key 115A, referred to herein as a manufacturer key $K_{MFGR}$. $K_{MFGR}$ 115A may be cryptographically related to $K_{PUBLIC}$ 113A and $K_{PRIVATE}$ 113B. Specifically, both $K_{MFGR}$ 115A and $K_{PRIVATE}$ 113B together are necessary to decrypt content encrypted with $K_{PUBLIC}$ 113A. The manufacturer key $K_{MFGR}$ 115A may be embedded in VHA devices 142, such as via mask level programming, by writing to a write-only memory, by blowing fuses, or by other methods known in the art. $K_{MFGR}$ 115A is preferably embedded in the VHA device 142 at or following manufacture, prior to the VHA devices 142 being distributed to the field. $K_{MFGR}$ 115A may be the same for all VHA devices 142 produced by a particular manufacturer, or different values of $K_{MFGR}$ 115A may be embedded in different VHA device 142 lines or product classes. In this embodiment, as depicted in FIG. 4, the decryption engine 148 receives the decrypted $K_{PRIVATE}$ 113B, and additionally receives $K_{MFGR}$ 115A, which is embedded in the VHA device 142. Using both keys 113B, 115A, the decryption engine 148 decrypts cipher stripes to recover virtual stripes, which are provided to the VHA fabric 156 on a just-in-time basis, as described above. The necessity of $K_{MFGR}$ 115A—in addition to $K_{PRIVATE}$ 113B—to decrypt encrypted virtual silicon allows system designers to restrict operation of their designs to a particular subset of potential VHA devices 142.

In an alternative embodiment, a manufacturer key $K_{MFGR}$ 115B may have no cryptographic relation to $K_{PUBLIC}$ 113A or $K_{PRIVATE}$ 113B and may simply comprise a random number, unique manufacturer identifier, or other value. In this embodiment, as depicted in FIG. 3, $K_{MFGR}$ 115B may be combined with $K_{SILICON}$ 128 to encrypt $K_{PRRIATE}$ 113B, thus yielding a system key $K_{SYSTEM}$ 134. Both $K_{MFGR}$ 115B and $K_{SILICON}$ 128 are required to recover $K_{PRIVATE}$ 113B from $K_{SYSTEM}$ 134. As shown in FIG. 4, $K_{MFGR}$ 115B, embedded in the VHA device 142, is supplied to the key decryption engine 152, along with $K_{SILICON}$ 128, to recover $K_{PRIVATE}$ 113B from $K_{SYSTEM}$ 134. $K_{PRIVATE}$ 113B is then provided to the decryption engine 148 as described above.

The silicon key $K_{SILICON}$ 128 has been described herein as a predetermined binary code presented to a predetermined plurality of input pins 154 of the VHA device 142. The binary code may be presented by tying the pins 154 to active high voltage and ground in a particular pattern, or may alternatively connect to a connector, wherein the $K_{SILICON}$ 128 binary code is supplied by another device connected to the connector. This embodiment works well for typical system design and deployment, wherein one or more packaged VHA devices 142 are placed in a system, such as on a printed circuit board. In some applications, however, greater security may be required, such as by providing signal level tying internally to the device package 142. Also, in some applications, VHA device dice 141 may be connected directly to other silicon dice, such as on a Multi-Chip Module. In other applications, the VHA device may be prepared as a core and made available in an ASIC library for inclusion within a design implemented on an ASIC or custom VLSI circuit.

In these or other situations, according to another embodiment of the present invention, the silicon key $K_{SILICON}$ 128 may be provided to the key decryption engine 152 by tying the I/O pads 153 of the die 141 to a predetermined pattern of voltage levels, rather than the pins 154 of the package 142. As depicted in FIG. 4, most die 141 I/O pads 153A-D are bonded directly to corresponding package 142 pins 154A-D, as is well known in the semiconductor arts. Selected I/O pads 153E, 153F, however, may be tied to an active high voltage level or signal ground, to form the binary pattern of $K_{SILICON}$ 128. From the point of view of VHA circuits, such as the key decryption engine 152, there is no difference. As used herein, the term "virtual hardware architecture integrated circuit" refers to an integrated circuit die 141 that implements the virtual hardware architecture described hereinabove, whether the die 141 is packaged into a package 142 for placement on a printed circuit board, or not.

Although the present invention has been described herein with respect to particular features, aspects and embodiments thereof, it will be apparent that numerous variations, modifications, and other embodiments are possible within the broad scope of the present invention, and accordingly, all variations, modifications and embodiments are to be regarded as being within the scope of the invention. The present embodiments are therefore to be construed in all aspects as illustrative and not restrictive and all changes coming within the meaning and equivalency range of the appended claims are intended to be embraced therein.

What is claimed is:

1. A system comprising:
   a circuit board;
   an integrated circuit package connected to said circuit board, said package having a plurality of input pins; and
   a programmable logic device integrated circuit packaged in said integrated circuit package, said integrated circuit having a plurality of input conductors and operative to perform cryptographic calculations employing a cryptographic key,
   whereby said cryptographic key is provided to said programmable logic device integrated circuit via a binary code applied to a predetermined plurality of said input conductors, said binary code being inaccessible when said system is deployed;
   wherein a predetermined plurality of said programmable logic device integrated circuit input conductors is connected to an active high voltage level or signal ground to form said binary code;
   wherein said predetermined plurality of conductors is not connected to said integrated circuit package input pins;
   wherein a predetermined plurality of said programmable logic device integrated circuit input conductors is connected to a predetermined plurality of said integrated circuit package input pins;
   said predetermined plurality of said integrated circuit package input pins is connected via said circuit board to an active high voltage level or signal ground to form said binary code; and
   at least said predetermined plurality of said integrated circuit package input pins is inaccessible when said system is deployed.

2. The system of claim 1, wherein said integrated circuit package comprises a ball grid array.

3. The system of claim 1, wherein circuit board traces connected to said predetermined plurality of integrated circuit package input pins are connected to said active high voltage level or said signal ground by internal layers of said circuit board.

4. The system of claim 3 further comprising a power supply connected to said circuit board, and wherein said circuit board traces connect said predetermined plurality of integrated circuit package input pins to an active high voltage level or signal ground output of said power supply.

5. The system of claim 3 further comprising a connector connected to said circuit board and having a plurality of contacts, and wherein said circuit board traces connect said predetermined plurality of integrated circuit package input pins to said plurality of connector contacts.

6. The system of claim 5 further comprising a data source connected to said connector contacts and operative to provide said binary code.

7. The system of claim 6, wherein said data source comprises a wireless receiver.

8. A system comprising:
   a circuit board;
   an integrated circuit package connected to said circuit board, said package having a plurality of input pins; and
   a programmable logic device integrated circuit packaged in said integrated circuit package, said integrated circuit having a plurality of input conductors and operative to perform cryptographic calculations employing a cryptographic key,
   wherein a predetermined plurality of said programmable logic device integrated circuit input conductors is connected to an active high voltage level or signal ground to form said binary code and is not connected to said integrated circuit package pins;
   wherein another predetermined plurality of said programmable logic device integrated circuit input conductors is connected to a predetermined plurality of said integrated circuit package input pins, said another predetermined plurality of said integrated circuit package input pins is connected via said circuit board to an active high voltage level or signal ground to form said binary code, and at least said predetermined plurality of said integrated circuit package input pins is inaccessible when said system is deployed; and
   whereby said cryptographic key is provided to said programmable logic device integrated circuit via a binary code applied to a dedicated, predetermined plurality of said input conductors.

9. The system of claim 8, wherein said integrated circuit package comprises a ball grid array.

10. The system of claim 8, wherein circuit board traces connected to said predetermined plurality of integrated circuit package input pins are connected to said active high voltage level or said signal ground by internal layers of said circuit board.

11. The system of claim 10 further comprising a power supply connected to said circuit board, and wherein said circuit board traces connect said predetermined plurality of integrated circuit package input pins to an active high voltage level or signal ground output of said power supply.

12. The system of claim 10 further comprising a connector connected to said circuit board and having a plurality of contacts, and wherein said circuit board traces connect said predetermined plurality of integrated circuit package input pins to said plurality of connector contacts.

13. The system of claim 12 further comprising a data source connected to said connector contacts and operative to provide said binary code.

14. The system of claim 13, wherein said data source comprises a wireless receiver.

15. The system of claim 8, wherein said programmable logic device is configured to use the cryptographic key to decrypt a received key.

16. The system of claim 8 wherein said programmable logic device is configured such that said binary code is inaccessible when said system is deployed.

* * * * *

UNITED STATES PATENT AND TRADEMARK OFFICE
CERTIFICATE OF CORRECTION

PATENT NO. : 7,711,964 B2 Page 1 of 1
APPLICATION NO. : 11/605669
DATED : May 4, 2010
INVENTOR(S) : Brian Christopher Van Essen et al.

It is certified that error appears in the above-identified patent and that said Letters Patent is hereby corrected as shown below:

Column 2, Line 18, delete "PLO" and substitute therefore -- PLD --.

Column 2, Line 39, delete "PLO" and substitute therefore -- PLD --.

Signed and Sealed this

Twenty-ninth Day of June, 2010

David J. Kappos
*Director of the United States Patent and Trademark Office*